United States Patent
Pasca (10) Patent No.: US 8,452,763 B1
(45) Date of Patent: May 28, 2013

(54) EXTRACTING AND SCORING CLASS-INSTANCE PAIRS

(75) Inventor: Marius Pasca, New York, NY (US)

(73) Assignee: Google Inc., Mountain View, CA (US)

( * ) Notice: Subject to any disclaimer, the term of this patent is extended or adjusted under 35 U.S.C. 154(b) by 269 days.

(21) Appl. No.: 12/727,940

(22) Filed: Mar. 19, 2010

Related U.S. Application Data (60) Provisional application No. 61/262,916, filed on Nov. 19, 2009.

(51) Int. Cl.
*G06F 17/30* (2006.01)

(52) U.S. Cl.
USPC .......................................... 707/727; 707/705

(58) Field of Classification Search
None
See application file for complete search history.

(56) References Cited

U.S. PATENT DOCUMENTS

| | | | |
|---|---|---|---|
| 7,366,715 B2 * | 4/2008 | Liu et al. ................ | 707/999.003 |
| 7,890,526 B1 | 2/2011 | Brewer et al. | |
| 2001/0000356 A1 | 4/2001 | Woods | |
| 2004/0034632 A1 | 2/2004 | Carmel et al. | |
| 2007/0233656 A1 * | 10/2007 | Bunescu et al. ................ | 707/3 |
| 2009/0083226 A1 | 3/2009 | Kawale et al. | |
| 2009/0271363 A1 * | 10/2009 | Bayliss ........................ | 707/102 |
| 2010/0145678 A1 | 6/2010 | Csomai et al. | |
| 2011/0035456 A1 * | 2/2011 | Milne et al. ................... | 709/206 |

OTHER PUBLICATIONS

Durme et al. "Weakly-Supervised Acquistion of open-Domain Classes and Class Attributes from Web Documents and Query logs" Proceedings of ACL-08: HLT, p. 19-27, Jun. 2008.*

Talukdar et al. "Weakly-Supervised Acquistion of Labeled Class Instances using Graph Random Walks" Proceedings of the 2008 Conference on Empirical Methods in Nature language Processing, p. 582-590, Oct. 2008.*

Hughes et al. "Lexical Semantic Relatedness with Random Graph Walks" Proceedings of Joint Conference on Empirical Methods in Natural Language Processing and Computational Natural Language Learning, p. 581-589, Jun. 2007.

\* cited by examiner

*Primary Examiner* — Yuk Ting Choi
(74) *Attorney, Agent, or Firm* — Fish & Richardson P.C.

(57) ABSTRACT

Methods, systems, and apparatus, including computer programs encoded on computer storage media, for extracting and scoring class-instance pairs. One method includes applying extraction patterns to document text to derive class-instance pairs, determining a frequency score and a diversity score for each distinct class-instance pair, and determining a pair score for each class-instance pair from the frequency score and the diversity score. Another method includes applying extraction patterns to document text to derive candidate class-instance pairs, determining, for each distinct candidate class-instance pair, a number of distinct phrases from which the distinct candidate class-instance pair was derived, and determining a pair score for each distinct candidate class-instance pair from the number of distinct phrases from which the candidate class-instance pair was extracted.

19 Claims, 3 Drawing Sheets

EXTRACTING AND SCORING CLASS-INSTANCE PAIRS

CROSS-REFERENCE TO RELATED APPLICATIONS

This application claims the benefit under 35 U.S.C. §119 (e) of U.S. Patent Application No. 61/262,916 titled "Content-Based Tag Recommendation, Category Discovery, and Re-ranking for Online Videos," filed Nov. 19, 2009, which is incorporated here by reference.

BACKGROUND

This specification relates to extracting class-instance pairs from document text.

A class-instance pair is made up of a class name corresponding to a name of an entity class and an instance name corresponding to an instance of the entity class. The instance of the entity class has an "is-a" relationship with the entity class; in other words, the instance of the entity class is an example of the entity class. An example class-instance pair is the pair (food, pizza), because pizza is a food.

Class-instance pairs are used in a variety of applications including, for example, knowledge base generation and query expansion. A knowledge base is a specialized database that includes information about entities and relationships between entities. Class-instance pairs are used in knowledge bases, for example, to determine relationships between entities. Query expansion occurs when additional words and phrases are added to a user search query before the search query is submitted to a search engine. The additional words and phrases are related to words and phrases in the user search query. Class-instance pairs are used in query expansion, for example, by adding instance names for class names occurring in a user query, or adding class names for instance names occurring in a user query.

Class-instance pair extraction systems apply extraction patterns to text and extract class names and entity names that match the patterns in the text. However, some patterns are overly general, and can result in false identifications of class-instance pairs. Some systems use additional data to filter out false class-instance pairs. However, this filtering is imprecise and can result in the removal of true class-instance pairs as well as false class-instance pairs.

SUMMARY

In general, one innovative aspect of the subject matter described in this specification can be embodied in methods that include the actions of receiving extraction patterns from a repository of extraction patterns; applying the extraction patterns to document text of one or more documents to derive a plurality of candidate class-instance pairs from the document text, wherein each candidate class-instance pair comprises a candidate class name and a candidate instance name derived by matching at least one of the extraction patterns to document text including the candidate class name and the candidate instance name; determining a frequency score and a diversity score for each candidate class-instance pair, wherein the frequency score relates to a frequency with which the class-instance pair was derived and the diversity score relates to a number of distinct extraction patterns that matched document text including the candidate class name and the candidate instance name of the candidate class-instance pair; and determining a pair score for each candidate class-instance pair in the plurality of candidate class-instance pairs from the frequency score and the diversity score. Other embodiments of this aspect include corresponding systems, apparatus, and computer programs recorded on computer storage devices, each configured to perform the operations of the methods.

These and other embodiments can each optionally include one or more of the following features. The frequency score is a function of a number of times the candidate class-instance pair was derived from the document text. The actions further include determining, for each candidate class-instance pair, a number of distinct phrases from which the candidate class-instance pair was derived. The frequency score for a candidate class-instance pair is derived from the number of distinct phrases from which the candidate class-instance pair was derived. The actions further include deriving the pair score for a candidate class-instance pair from a respective weight associated with each extraction pattern used to derive the candidate class-instance pair. Determining the pair score comprises multiplying the frequency score by the diversity score.

The actions further include selecting a particular instance name; identifying a plurality of class names for the instance name from the candidate class-instance pairs, wherein each identified class name is included in a respective candidate class-instance pair that also includes the particular instance name; ranking the identified plurality of class names according to the pair scores for the respective class-instance pairs; and removing one or more of the candidate class-instance pairs according to the ranking. Identifying a candidate class-instance pair from the document text comprises identifying a candidate class name and a plurality of candidate instance names from the document text, selecting one of the candidate instance names using query data for previously submitted search queries, and identifying a class-instance pair corresponding to the candidate class name and the selected candidate instance name. Selecting one of the candidate class-instance names comprises selecting a longest class-instance name matching a phrase in the query data.

The actions further include determining that the candidate class name of a first class-instance pair includes part of a compound word phrase, and a completion of the compound word phrase is adjacent to the document text from which the candidate class name was derived; and replacing the candidate class name of the first class-instance pair with the compound word phrase. The actions further include determining that the candidate instance name of a first class-instance pair includes part of a compound word phrase, and a completion of the compound word phrase is adjacent to the document text from which the candidate instance name was derived; and replacing the candidate instance name of the first class-instance pair with the compound word phrase.

In general, another innovative aspect of the subject matter described in this specification can be embodied in methods that include the actions of receiving extraction patterns from a repository of extraction patterns; applying the extraction patterns to document text of one or more documents to derive a plurality of candidate class-instance pairs from the document text, wherein each candidate class-instance pair comprises a candidate class name and a candidate instance name derived by matching at least one of the extraction patterns to document text including the candidate class name and the candidate instance name; determining, for each distinct candidate class-instance pair, a number of distinct phrases from which the distinct candidate class-instance pair was derived; and determining a pair score for each distinct candidate class-instance pair in the plurality of class-instance pairs from the number of distinct phrases from which the candidate class-instance pair was derived. Other embodiments of this aspect include corresponding systems, apparatus, and computer programs recorded on computer storage devices, each configured to perform the operations of the methods.

These and other embodiments can each optionally include one or more of the following features. The pair score for a distinct candidate class-instance pair is further determined according to a diversity score derived from a number of distinct extraction patterns that matched document text including the candidate class name and the candidate instance name of the distinct candidate class-instance pair. The actions further include determining that a first phrase and a second phrase from which a candidate class-instance pair was derived are distinct phrases by generating a first representation of the first phrase and a second representation of the second phrase and determining that the first representation is different from the second representation. The first phrase and the second phrase are each a sentence. Generating the first representation comprises: generating a reduced representation of the first phrase, wherein the reduced representation of the first phrase is generated by removing punctuation and whitespace from the first phrase; and generating the first representation from a predetermined number of characters in the reduced representation.

Particular embodiments of the subject matter described in this specification can be implemented so as to realize one or more of the following advantages. Class-instance pair repositories can be generated from the application of extraction patterns to document text. Class-instance pairs can be scored to reflect a quality of the class-instance pairs. Class-instance pairs can be filtered without relying on sources of filtering data external to the documents used for extraction.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
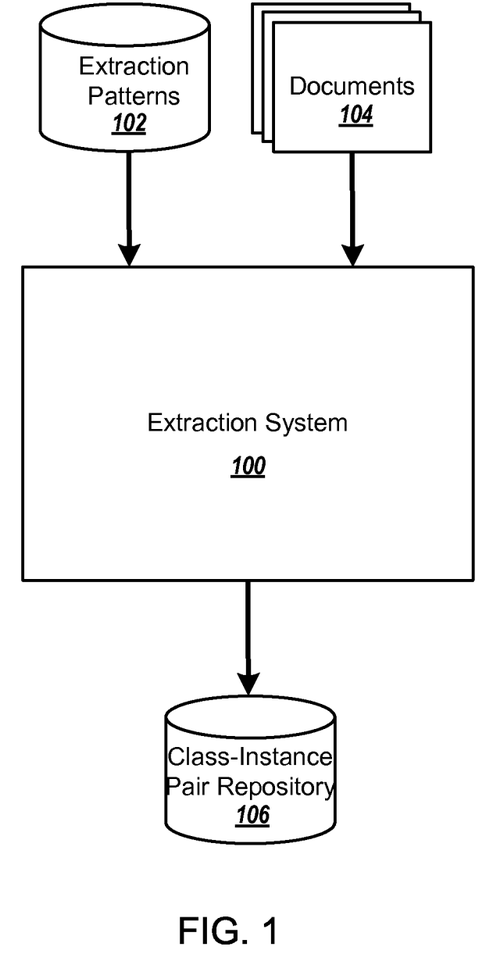
FIG. 1 is a block diagram of an example extraction system.

FIG. 1 is a block diagram of an example extraction system 100. The extraction system is implemented by software running on one or more computers that processes extraction patterns 102 and electronic documents 104 in order to derive and score class-instance pairs 106. The system 100 applies multiple extraction patterns 102 to the text of electronic documents 104 to derive the class-instance pairs 106.

Each extraction pattern 102 is a pre-defined pattern that defines a rule for matching class and instance names in text. For example, the following pattern can be used to derive a class name C and an instance name I for an instance from document text:

<[ . . . ] C [such as|including|e.g.|like] I [and|,|.]>.

Consider an example where this pattern is applied to the document text "foods, such as pizza, are delicious." In this example, the class name "foods" and the instance name "pizza" are extracted from the document text.

Each electronic document 104 (which for brevity will simply be referred to as a document) may, but need not, correspond to a file in a conventional file system. A document may be stored in a portion of a file that holds other documents, in a single file dedicated to the document in question, or in multiple coordinated files. The documents 104 can be, for example, the web documents indexed by a search engine, or some portion of the web documents indexed by a search engine.

The extraction system 100 applies the extraction patterns to the text of the documents to derive class-instance pairs, for example, using conventional methods. The system can derive the same class-instance pair multiple times, and can derive the same class-instance pair using multiple patterns. The extraction system 100 scores each distinct class-instance pair, as will be described in more detail below with reference to FIG. 2.

The system stores each distinct class-instance pair and its associated score in a class-instance pair repository 106.

Figure 2:
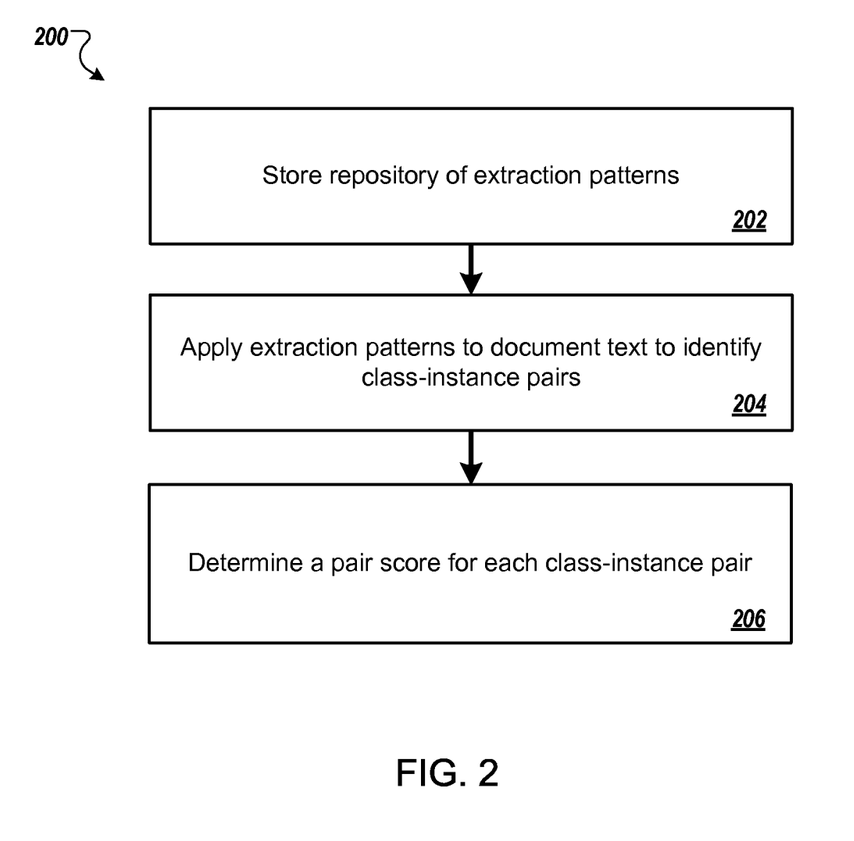
FIG. 2 is a flow diagram of an example process for extracting and scoring class-instance pairs.

FIG. 2 is a flow diagram of an example process 200 for extracting and scoring class-instance pairs. For convenience, the process 200 will be described in reference to a system of one or more computers that performs the process 200. The system can be, for example, the extraction system 100 described above with reference to FIG. 1.

The system receives extraction patterns from a repository of extraction patterns (202). The system applies the extraction patterns to document text to derive class-instance pairs (204).

In some implementations, the system uses conventional techniques to apply the extraction patterns to the document text and to identify class-instance pairs from document text that matches the pattern. However, the boundaries of the class names and the entity names are not always clear. Consider an example where the pattern is <[ . . . ] C including I [ . . . ]> and the matching document text is "Western European countries including France." In this example, when the pattern is applied, the identified class name could be "countries" "European countries" or "Western European countries." To address these ambiguities, in some implementations, the system identifies the boundaries of the class names C from parts-of-speech tags applied to the text of the document. For example, the system can require that the class name C be a longest possible noun phrase in the matching document text. A noun phrase, as used herein, is a sequence of adjectives or nouns ending in a noun. The noun can be a singular form noun or a plural form noun, depending on the pattern being used. Example noun phrases include "food," "European banks," and "Western European countries."

Consider another example where the pattern is <[ . . . ]C including I [ . . . ]> and the matching document text is "unusual restaurants including hot dog stands." In this example, when the pattern is applied, the identified instance name could be "hot," "hot dog," or "hot dog stands." To address these ambiguities, in some implementations, the system identifies the boundaries of the instance names I by comparing the candidate instance names to a list of known commonly used phrases. The system selects a candidate instance name that matches the list of known commonly used phrases. For example, the system can select the longest candidate instance name that matches the list of known commonly used phrases. The list of known commonly used phrases can be identified from various sources, for example, from a query log. A query log is a collection of queries previously submitted to a search engine. The query log is preferably anonymized to preserve user privacy.

In some implementations, the comparison is case sensitive. In other implementations, the comparison is case insensitive, for example, the text of the candidate instance names and the text in the query logs can all be converted to lowercase. If none of the candidate instance names match the phrases in the list of known commonly used phrases, the system does not generate a class-instance pair.

The system can perform various standardizations and normalizations on the text of the class-instance pairs. For example, in some implementations, the derived class names and instance names can be converted to a common format, for example, by converting all of the text to lowercase.

In some implementations, the system augments the class names in the class-instance pairs so that the class names include compound word phrases. This augmentation can be done as part of the extraction of the class-instance pairs, or as a separate step following the extraction of the class-instance pairs, for example, if the system maintains both the derived class-instance pair and the text from which the class-instance pair was derived. A compound word phrase is a phrase including words that, when connected with a hyphen, are a compound word. An example compound word phrase is the phrase "four wheel," because "four-wheel" is a compound word. The system generates a list of common compound words, for example, by identifying a top number of compound words occurring in the document text of the documents being processed. The system then modifies the class names in the class-instance pairs so that, if a compound phrase corresponding to one of the top number of compound words could have been included in the class name, the class name is updated to include the compound phrase. For example, if the class name "wheel drive vehicles" was derived from a phrase beginning "four wheel drive vehicles," and "four-wheel" is one of the most common compound words, the system can update the class name "wheel drive vehicles" to be "four wheel drive vehicles." This augmentation is useful, for example, when words are incorrectly tagged with parts of speech, or incorrect rules are used to determine what text to select as the candidate name or the instance name.

In some implementations, the system uses a series of MapReduce steps implemented using a MapReduce framework and programming model to identify the class-instance pairs. An example implementation of MapReduce is described in U.S. Pat. No. 7,650,331, to Dean et al., for "System And Method For Efficient Large-Scale Data Processing", issued Jan. 19, 2010. The use of MapReduce can result in an efficient extraction of class-instance pairs. For example, the system can use a first MapReduce step that receives document text and extraction patterns. The first MapReduce step applies the extraction patterns to the document text and generates output, for each identified class-instance pair, that specifies the text that matched a pattern and the surrounding text, an identification of the pattern that matched the text, and where the class name and instance name start and end in the text that matched the pattern. A subsequent MapReduce step receives the output of the first MapReduce step and augments the class and instance names with compound word phrases, when appropriate.

The system determines a pair score for each class-instance pair (206). The pair score for each class-instance pair is derived from one or more parameters. Example parameters include frequency of extraction and the diversity of the patterns used to derive the class-instance pair.

For example, in some implementations, the pair score for a class-instance pair (C, I) is calculated according to the following formula:

$$Score(C,I) = Size(\{Pattern(C,I)\})^2 \times Freq(C,I),$$

where the size of Pattern(C, I) is the number of different patterns from which the pair of the class name C and the instance name I was derived, and Freq(C, I) is a frequency score having a value related to the number of times the class-instance pair was derived from the documents.

In some implementations, the frequency score is derived from a total number of times that the class-instance pair was derived from the documents. For example, if the class-instance pair was derived 100 times, the frequency score is 100, or some function of 100, e.g., a logarithm.

As another example, the frequency score can be a mutual information score for the class name and the instance name. The mutual information score is derived from the number of times the class name and the instance name were derived, as well as the number of times that class-instance pairs that include either the class C or the instance I were derived. For example, the mutual information score MI for class-instance pair (C, I) can be derived according to the following formula:

$$MI(X, Y) = \frac{P(C \& I) \times \log(P(C \& I))}{P(C) \times P(I)} + \frac{P(C \& \text{not } I) \times \log(P(C \& \text{not } I))}{P(C) \times P(\text{not } I)} + \frac{P(\text{not } C \& I) \times \log(P(\text{not } C \& I))}{P(\text{not } C) \times P(I)} + \frac{P(\text{not } C \& \text{not } I) \times \log(P(\text{not } C \& \text{not } I))}{P(\text{not } C) \times P(\text{not } I)}.$$

The probabilities used in calculating the mutual information score can be calculated as follows. P(C & I) is the number of times the class-instance pair (C, I) was derived divided by the total number of times any class-instance pairs were derived. P(C & not I) is the number of times class-instance pairs containing the class name C and an instance name other than I were derived, divided by the total number of times any class-instance pairs were derived. P(not C & I) is the number of times class-instance pairs containing the instance I and a class name other than the class name C were derived, divided by the total number of times any class-instance pairs were derived. P(C) is the total number of times class-instance pairs containing the class C were derived divided by the total number of times any class-instance pairs were derived. P(not C) is equal to 1-P(C). P(I) is the total number of times class-instance pairs containing the instance I were derived divided by the total number of times any class-instance pairs were derived. P(not I) is equal to 1-P(I).

In some implementations, the frequency score is derived from a number of unique phrases from which a class-instance pair was derived. For example, if the class-instance pair was derived 100 times, but only derived from 50 unique phrases, the frequency score is 50, or some function of 50, e.g., a logarithm or a mutual information score calculated as described above using numbers of unique phrases rather than total numbers of extractions. The phrase can be, for example, the text that matched the extraction pattern or a sentence including the text that matched the extraction pattern. In some implementations, the system determines the number of unique phrases by performing a series of pairwise comparisons of the phrases. The system can determine whether two phrases are distinct by directly comparing the characters of the two phrases. If the characters differ, the two phrases are distinct. Alternatively, the system can generate a representation of each phrase, for example, a fingerprint representation, and compare the two fingerprint representations. If the two fingerprint representations differ, the two phrases are distinct.

In some implementations, the system generates a reduced representation of the phrase, for example, by removing punctuation and whitespace, and then generates the fingerprint representation from the reduced representation.

Figure 3:
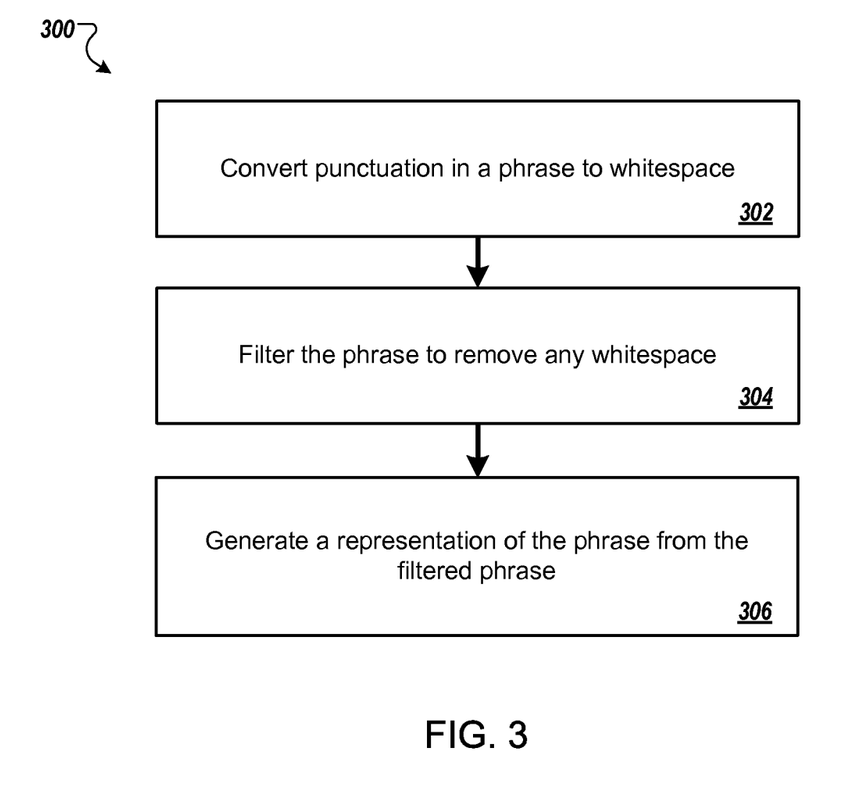
FIG. 3 is a flow diagram of an example process for generating a representation of a phrase.

FIG. 3 is a flow diagram of an example process 300 for generating a representation of a phrase. For convenience, the process 300 will be described in reference to a system of one or more computers that performs the process 300. The system can be, for example, the extraction system 100 described above with reference to FIG. 1.

The system converts punctuation in a phrase to whitespace (302). For example, the system can convert each use of punctuation in a phrase to a single space. The system filters the phrase to remove any whitespace (304). The system then generates a representation of the phrase from the filtered phrase (306).

In some implementations, the representation of the phrase is the filtered phrase itself. In other implementations, the representation of the phrase is derived from up to a pre-determined number n characters of the filtered phrase. An example value for n is 250. The representation can be, for example, a fingerprint representation generated by applying a hash function to the n characters of the filtered phrase.

In some implementations of scoring class-instance pairs (FIG. 2), each pattern has an associated scoring weight that represents a pre-determined estimate of the quality of class-instance pairs that are derived using the pattern. Different extraction patterns have differing levels of confidence. For example, the extraction pattern <C, e.g., I> has a high level of confidence, because in most phrases of the form "C, e.g., I," the term I is an example of the term C. However, the extraction pattern <C like I> has a lower level of confidence, because it matches both phrases of the form "desserts like cake" and "humans like cake."

In some implementations, the scoring weight for a given pattern is derived from whether the terms in the pattern can be interpreted as multiple parts of speech. Patterns whose terms can be interpreted as multiple parts of speech can be assigned a lower scoring weight. For example, the term "like" in the pattern can be interpreted as both a preposition ("desserts like cake") and as a verb ("humans like cake"). The scoring weights can be generated manually.

When the extraction patterns have associated weights, the pair score for a class-instance pair can reflect the weights of the patterns used to derive the class-instance pair. For example, in some implementations, the score for a class-instance pair (C, I) is:

$$\text{Score}(C, I) = \text{Size}(\{\text{Pattern}(C, I)\})^2 \times \sum_{p \in \{\text{Pattern}(C,I)\}} w_p \text{Freq}((C, I), p),$$

where Pattern(C, I) is the set of patterns for which the pair (C, I) was identified, $w_p$ is the weight of pattern p, and Freq((C, I),p) is the frequency with which the pair (C, I) was identified using pattern p.

Alternatively, the system can first score the class-instance pairs without using the weights and can then demote class-instance pairs identified using extraction patterns with a low scoring weight. A low scoring weight is a weight below a pre-determined threshold. For example, the system can demote a class-instance pair if the class-instance pair was only derived using extraction patterns having low scoring weights.

In some implementations, the system performs a series of MapReduce steps implemented using a MapReduce framework and programming model to score the class-instance pairs. For example, the system can use a first MapReduce step that receives data identifying, for each derived class-instance pair, the text that matched a pattern and its surrounding text, an identification of the pattern that matched the text, and where the class name and instance name start and end in the text that matched the pattern. The first MapReduce step determines a frequency score for each distinct class-instance pair. The output of the first MapReduce step is data associating distinct class-instance pairs with the determined frequency score. A second MapReduce step receives the same data as the first MapReduce step and generates a diversity score for each distinct class-instance pair. The output of the second MapReduce step is data associating each distinct class-instance pair with the determined diversity score. A third MapReduce step receives the output from the first and second MapReduce steps and generates an overall score for each class-instance pair, for example, as described above. In some implementations, the second and third MapReduce steps are combined into a single MapReduce step.

Once the system scores the class-instance pairs, the system can use the pair scores to rank, for each instance, the classes associated with the instance in class-instance pairs. The system can identify, for a given instance, each class associated with the instance in the class-instance pairs and then rank the classes according to the pair score of the class-instance pair corresponding to the class and the instance. The system can similarly rank, for each class, the instances associated with the class in class-instance pairs.

In some implementations, the system filters the class-instance pair repository according to the pair scores or the ranks of the class-instance pairs. For example, the system can remove all class-instance pairs with a pair score below a pre-determined threshold. As another example, the system can keep only a top number of ranked class-instance pairs for each class, or each instance, and remove the other class-instance pairs.

Once generated, the scored class-instance pairs can be provided for immediate use, or stored for later use, by other systems or applications. For example, data mapping each class name to each instance name associated with the class name in a class-instance pair, and optionally a score for each instance name, can be provided or stored. As another example, data mapping instance names to each class name associated with the instance name in a class-instance pair, and optionally a score for each class name, can be provided or stored. The data can be used in various applications, for example, the construction of knowledge bases or query expansion.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions encoded on a computer storage medium for execution by, or to control the operation of, data processing apparatus. Alternatively or in addition, the program instructions can be encoded on a propagated signal that is an artificially generated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system comprising:
one or more computers including one or more storage devices storing instructions that when executed by the one or more computers cause the one or more computers to perform operations comprising:
receiving extraction patterns from a repository of extraction patterns;
applying the extraction patterns to document text of one or more documents to derive a plurality of candidate class-instance pairs from the document text, wherein each candidate class-instance pair comprises a candidate class name and a candidate instance name derived by matching at least one of the extraction patterns to document text including the candidate class name and the candidate instance name;
determining a frequency score and a diversity score for each candidate class-instance pair, wherein the frequency score relates to a frequency with which the class-instance pair was derived and the diversity score relates to a number of distinct extraction patterns that matched document text including the candidate class name and the candidate instance name of the candidate class-instance pair; and
determining a pair score for each candidate class-instance pair in the plurality of candidate class-instance pairs from the frequency score and the diversity score, wherein determining the pair score comprises multiplying the frequency score by the diversity score.

2. The system of claim 1, wherein the frequency score is a function of a number of times the candidate class-instance pair was derived from the document text.

3. The system of claim 1, wherein the operations further comprise:
determining, for each candidate class-instance pair, a number of distinct phrases from which the candidate class-instance pair was derived;
wherein the frequency score for a candidate class-instance pair is derived from the number of distinct phrases from which the candidate class-instance pair was derived.

4. The system of claim 1, wherein the operations further comprise deriving the pair score for a candidate class-instance pair from a respective weight associated with each extraction pattern used to derive the candidate class-instance pair.

5. The system of claim 1, wherein the operations further comprise:
selecting a particular instance name;
identifying a plurality of class names for the instance name from the candidate class-instance pairs, wherein each identified class name is included in a respective candidate class-instance pair that also includes the particular instance name;
ranking the identified plurality of class names according to the pair scores for the respective class-instance pairs; and
removing one or more of the candidate class-instance pairs according to the ranking.

6. The system of claim 1, wherein deriving a candidate class-instance pair from the document text comprises identifying a candidate class name and a plurality of candidate instance names from the document text, selecting one of the candidate instance names using query data for previously submitted search queries, and deriving a class-instance pair corresponding to the candidate class name and the selected candidate instance name.

7. The system of claim 6, wherein selecting one of the candidate class-instance names comprises selecting a longest class-instance name matching a phrase in the query data.

8. The system of claim 1, wherein the operations further comprise:
determining that the candidate class name of a first class-instance pair includes part of a compound word phrase, and a completion of the compound word phrase is adjacent to the document text from which the candidate class name was derived; and
replacing the candidate class name of the first class-instance pair with the compound word phrase.

9. The system of claim 1, wherein the operations further comprise:
determining that the candidate instance name of a first class-instance pair includes part of a compound word phrase, and a completion of the compound word phrase is adjacent to the document text from which the candidate instance name was derived; and
replacing the candidate instance name of the first class-instance pair with the compound word phrase.

10. A computer-implemented method, comprising:
receiving extraction patterns from a repository of extraction patterns;
applying the extraction patterns to document text of one or more documents to derive a plurality of candidate class-instance pairs in the document text, wherein each candidate class-instance pair comprises a candidate class name and a candidate instance name derived by matching at least one of the extraction patterns to document text including the candidate class name and the candidate instance name;
determining a frequency score and a diversity score for each candidate class-instance pair, wherein the frequency score relates to a frequency with which the class-instance pair was derived and the diversity score relates to a number of distinct extraction patterns that matched document text including the candidate class name and the candidate instance name of the candidate class-instance pair; and
determining a pair score for each candidate class-instance pair in the plurality of candidate class-instance pairs from the frequency score and the diversity score, wherein determining the pair score comprises multiplying the frequency score by the diversity score.

11. The method of claim 10, wherein the frequency score is a function of a number of times the candidate class-instance pair was derived from the document text.

12. The method of claim 10, further comprising:
determining, for each candidate class-instance pair, a number of distinct phrases from which the candidate class-instance pair was derived;
wherein the frequency score for a candidate class-instance pair is derived from the number of distinct phrases from which the candidate class-instance pair was derived.

13. The method of claim 10, further comprising deriving the pair score for a candidate class-instance pair from a respective weight associated with each extraction pattern used to derive the candidate class-instance pair.

14. The method of claim 10, further comprising:
selecting a particular instance name;
identifying a plurality of class names for the instance name from the candidate class-instance pairs, wherein each identified class name is included in a respective candidate class-instance pair that also includes the particular instance name;
ranking the identified plurality of class names according to the pair scores for the respective class-instance pairs; and
removing one or more of the candidate class-instance pairs according to the ranking.

15. The method of claim 10, wherein deriving a candidate class-instance pair from the document text comprises identifying a candidate class name and a plurality of candidate instance names from the document text, selecting one of the candidate instance names using query data for previously submitted search queries, and deriving a class-instance pair corresponding to the candidate class name and the selected candidate instance name.

16. The method of claim 15, wherein selecting one of the candidate class-instance names comprises selecting a longest class-instance name matching a phrase in the query data.

17. The method of claim 10, further comprising:
determining that the candidate class name of a first class-instance pair includes part of a compound word phrase, and a completion of the compound word phrase is adjacent to the document text from which the candidate class name was derived; and
replacing the candidate class name of the first candidate class-instance pair with the compound word phrase.

18. The method of claim 10, further comprising:
determining that the candidate instance name of a first class-instance pair includes part of a compound word phrase, and a completion of the compound word phrase is adjacent to the document text from which the candidate instance name was derived; and
replacing the candidate instance name of the first class-instance pair with the compound word phrase.

19. A non-transitory computer storage medium encoded with a computer program, the computer program comprising instructions, that when executed by data processing apparatus, cause the data processing apparatus to perform operations comprising:
receiving extraction patterns from a repository of extraction patterns;
applying the extraction patterns to document text of one or more documents to derive a plurality of candidate class-instance pairs from the document text, wherein each candidate class-instance pair comprises a candidate class name and a candidate instance name derived by matching at least one of the extraction patterns to document text including the candidate class name and the candidate instance name;
determining a frequency score and a diversity score for each candidate class-instance pair, wherein the frequency score relates to a frequency with which the class-instance pair was derived and the diversity score relates to a number of distinct extraction patterns that matched document text including the candidate class name and the candidate instance name of the candidate class-instance pair; and
determining a pair score for each candidate class-instance pair in the plurality of candidate class-instance pairs from the frequency score and the diversity score, wherein determining the pair score comprises multiplying the frequency score by the diversity score.

* * * * *

UNITED STATES PATENT AND TRADEMARK OFFICE
CERTIFICATE OF CORRECTION

PATENT NO. : 8,452,763 B1
APPLICATION NO. : 12/727940
DATED : May 28, 2013
INVENTOR(S) : Marius Pasca It is certified that error appears in the above-identified patent and that said Letters Patent is hereby corrected as shown below:

Title Page, column 2 (Other Publications), entry 1, line 1, delete "Acquistion" and insert -- Acquisition --, therefor.

Title Page, column 2 (Other Publications), entry 2, line 1, delete "Acquistion" and insert -- Acquisition --, therefor.

Signed and Sealed this
Twentieth Day of August, 2013

Teresa Stanek Rea
*Acting Director of the United States Patent and Trademark Office*